(12) United States Patent
Krause et al.

(10) Patent No.: US 7,472,851 B2
(45) Date of Patent: Jan. 6, 2009

(54) METHOD AND DEVICE FOR THE DISINTEGRATION OF ESPECIALLY INORGANIC MATERIALS

(75) Inventors: Peter Krause, Grosskarolinenfeld (DE); Alfred Baron, Munich (DE); Georg Hilger, Ostermuenchen (DE); Walter Menzel, Dueren (DE); Ulf Pahnke, Starnberg (DE); Rainer Krenski, Staudach-Egerndach (DE)

(73) Assignee: Krause Maschinenbau GmbH, Tuntenhausen (DE)

( * ) Notice: Subject to any disclaimer, the term of this patent is extended or adjusted under 35 U.S.C. 154(b) by 0 days.

(21) Appl. No.: 10/531,815

(22) PCT Filed: Oct. 14, 2003

(86) PCT No.: PCT/DE03/03402

§ 371 (c)(1),
(2), (4) Date: Jul. 6, 2005

(87) PCT Pub. No.: WO2004/037425

PCT Pub. Date: May 6, 2004

(65) Prior Publication Data

US 2005/0253000 A1 Nov. 17, 2005

(30) Foreign Application Priority Data

Oct. 17, 2002 (DE) .................... 102 48 612
Dec. 19, 2002 (DE) .................... 102 59 456

(51) Int. Cl.
*B02C 19/06* (2006.01)
(52) U.S. Cl. ............................. 241/5; 241/1

(58) Field of Classification Search ...... 241/1, 241/5, 188.1, 188.2, 301
See application file for complete search history.

(56) References Cited

U.S. PATENT DOCUMENTS

| 2,338,373 | A |   | 1/1944  | Aurig              |
|-----------|---|---|---------|--------------------|
| 3,062,457 | A | * | 11/1962 | Willems ...... 241/1 |
| 4,269,363 | A |   | 5/1981  | Entzmann           |
| 4,406,409 | A |   | 9/1983  | Durek              |
| 4,522,342 | A |   | 6/1985  | Munschenborn et al.|

FOREIGN PATENT DOCUMENTS

| DE | 1 236 915 | 3/1967 |
| DE | 117 437   | 1/1976 |
| DE | 28 27 944 | 4/1979 |

(Continued)

*Primary Examiner*—Faye Francis
(74) *Attorney, Agent, or Firm*—Jordan and Hamburg LLP

(57) ABSTRACT

The invention relates to a method for the disintegration and tribochemical activation of especially inorganic materials having a crystalline structure, wherein the starting materials are comminuted (disintegrated) to a particle size of less than 1 μm by the effect of impacting pressure fronts at a pulse duration of less that 10 μs and a sequence frequency of more than 8 kHz. A conglomerate of activated mixed crystals is then obtained. Said conglomerate has an increased aptitude for the formation of modified crystals when water is added. The duration of the effect of the impacting pressure fronts continues until the crystal lattice structure of the particles (30) is destroyed. A device for the disintegration and tribochemical activation of said materials is based on rotating disks whereon molded bodies with aerodynamical profiles are arranged, said molded bodies being continuously displaced in a transonic speed range and impacting pressure fronts being produced on the outflow surfaces thereof.

11 Claims, 4 Drawing Sheets

FOREIGN PATENT DOCUMENTS

| | | |
|---|---|---|
| DE | 30 34 849 | 4/1982 |
| DE | 195 48 645 | 6/1997 |
| EP | 0 470 948 | 2/1992 |
| EP | 0 949 217 | 10/1999 |
| WO | WO-97/38949 | 10/1997 |
| WO | WO-99/06150 | 2/1999 |

\* cited by examiner

METHOD AND DEVICE FOR THE DISINTEGRATION OF ESPECIALLY INORGANIC MATERIALS

The invention relates to a method and an apparatus for the disintegration and tribochemical activation in particular of inorganic materials.

Disintegrators are known for a number of applications. In cement production, for instance, on the industrial scale, chunks of limestone and various additives are first comminuted, then heated to temperatures of 1400° C. to 1600° C., sintered, and then ground to the desired grain sizes. The disadvantage of this method is that a large amount of energy is needed for activating the starting materials.

Known from DE 195 48 645 is attaining an elevated potential energy content and thus increased chemical reactability using tribochemically treated crystals. For instance, mechanical activation of cement facilitates a substantial increase in the strength of the hydrated mineral bonding agent. The reasons for this are the primary particle size and the lattice distortions of these particles.

A plurality of processing methods are available for tribometric processing of starting materials such as e.g. grinding by stressing between two surfaces, or using collisions between freely mobile particles and solid surfaces or collisions among the particles themselves. So-called disintegrators are used for inserting high potential energy into the smallest of particles on a scale of a few μm and for thus causing lattice distortions. The construction principle is characterized by two pin rings or ring gears. In one variant, as described in DE-AS 12 36 915, the particles are comminuted in collisions with pins or teeth. At least three collisions with pins at intervals of no more than 50 ms at a relative speed of at least 15 m/s are required for adequate activation. In this arrangement it is disadvantageous that the wear on the pins is very high, especially when using very hard starting materials.

In another variant, e.g. in accordance with DE 30 34 849 A1, the starting material is primarily comminuted using particle collisions in vortices, the vortices being generated by specially shaped blade rings driven in opposite directions. At the same time wear is substantially reduced on the edges of the blade rings or ring gears that are impacted.

The activation that can be attained with known disintegrators or mills is not adequate for developing novel inorganic bonding agents. Particularly when there are small, lightweight particles such as occur after brief milling, it is not possible to cause these particles to collide at a high relative speed of for instance greater than 100 m/s by embedding these particles in a stream of air or in an air vortex.

The object of the invention is to provide a method and an apparatus for disintegration in which dynamic treatment of the particles occurs with substantially increased energies and rates of effectiveness compared to the prior art.

This object of the invention is attained using a disintegrator of the generic type indicated in the foregoing in which the starting materials in the form of a granulate are subjected to impact pressure waves from a broad frequency spectrum and a pulse duration of less than 10 μs. Further comminution of the particles, destroying the crystal lattice structure, occurs due to the effect of the impact pressure waves striking the particles in quick succession at supersonic speed. As a result of this comminution, a conglomerate of mixed crystals occurs that has an increased capacity for crystal formation when water is added later. The impact pressure waves are generated by shaped bodies with aerodynamically shaped profiles and surfaces that are accelerated to the so-called transonic range. With these, impact pressure fronts are generated that pulverize the granulate introduced into the disintegrator to the desired particle size. The shaped bodies move on disks just below supersonic speed. Because of the effect of high mechanical energy, in addition to being comminuted, the particles are activated and thus undergo a change in chemical properties.

In the case of organic substances, pretreatment is required for the purpose of reducing elasticity.

If the relative speed of the air flowing against the shaped bodies, including the particles suspended in the air, is now just below sound velocity, the flow speed can in part reach supersonic speed relative to the shaped body. The speed range below sound velocity at which the air flowing around the formed bodies in part has supersonic speed is called the transonic speed range in the literature (Sigloch: Technische Fluidmechanik, VDI Publishing, 1996).

Appropriate protective gases can be employed instead of air for avoiding chemical reactions.

Depending on the shape of the aerodynamically shaped body, the transonic speed range commences at 0.75 . . . 0.85 Mach and terminates when the shaped body attains sound velocity with regard to the air flowing against it.

If the speed of the air flowing against it relative to the shaped body is in the transonic speed range, supersonic speed relative to the aerodynamic profile of the shaped body occurs in a zone. This zone of air flowing supersonically relative to the shaped body is limited by a forward front, a rear front, and the profile of the shaped body. A transition from supersonic speed to normal speed takes place on the rear front. This transition is accompanied by an impact pressure front, i.e. the air pressure rises to a multiple of normal pressure and then returns to normal pressure after a brief low pressure phase. The special characteristic of this impact pressure front is that the change in pressure is theoretically limited to a few molecule lengths, but in practice it is on the magnitude of 100 μm due to heating and vortices, and in any case is very short with respect to the geometry of the shaped bodies.

These effects are adequately known in the development of support surface profiles for supersonic aircraft and are undesired. The impact pressure front severely stresses the exterior skin of the wings. In addition, the compression of the air into an impact pressure front requires increased propulsion energy for the aircraft. There is therefore an attempt to moderate the effects of the transonic speed range and to overcome this range rapidly ("break the sound barrier") by specially designing the support surface profiles.

In accordance with the invention, the effects of the transonic speed range are used for the comminution and activation of mineral granulate. The use of the impact pressure front is very efficient due to two factors. First, the impact pressure front is a very brief pulse with a build-up time of a few μs. Second, the immediate succession of pressure increase and pressure decrease is very effective in terms of mechanically stressing the granulate. In terms of spectrum, the pressure impact can be understood as the sum of pressure waves of very different frequencies. Thus, depending on the steepness of the pressure impact, frequency portions of pressure waves with a few 100 kHz are also included. Therefore portions of a characteristic breaking frequency that is particularly effective in the direction of the desired comminution and activation occur for different particle sizes and consistency.

The inventive structure of the disintegrator thus subjects the granulate, that is, the particles, to several hundred of these impact pressure fronts successively. This is initially attained by using a plurality of shaped bodies that rotate about a common axis. In addition, a counter-rotating group of shaped bodies prevents the relative speed of the shaped bodies from being reduced with respect to the air with the embedded granulate, that is, particles, due to pulling effects. Thus the particles move relatively slowly, relative to sound velocity, through the disintegration space due to alternating pulling of the particles in the one or other direction.

The repetition rate of the impact pressure fronts is in the supersonic range, are inaudible, and can be dampened relatively well to protect operators.

When the forward surfaces of the shaped body are designed suitably, the particles seldom collide with the shaped bodies because in particular smaller particles are pulled around the surface of the shaped bodies. It is not necessary to provide special armoring or protection of the forward surfaces of the shaped bodies. It is only on the outlet side, that is, in the rear area relative to the flow, that higher loads occur at the point of intersection between the impact pressure front and the surface of the shaped body, and these loads can be supported by suitable materials such as high-alloy tool steels. It is useful to design the surface of the shaped body as a so-called sub-critical profile, that is, the flow around it is largely laminar (Sigloch: Technische Fluidmechanik; VDI Publishing, 1996). The shaped body is for instance rounded on the forward front and its off-flow surfaces meet at an acute angle.

The invention is described in greater detail in the following using an exemplary embodiment.

Figure 1A:
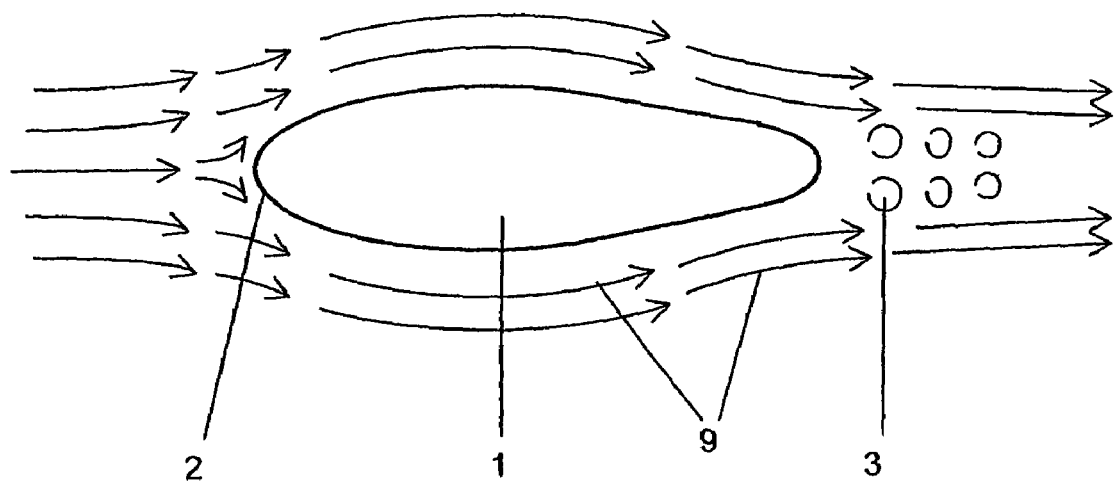
FIG. 1a illustrates the profile of the shaped body, with the flow going around it in the sub-sonic range.

FIG. 1a illustrates a typically shaped body 1 together with flow lines 9 in the subsonic range. The flow lines 9 initially flow in a laminar manner around the profile of the shaped body 1, whereby, depending on the profile of the shaped body 1, the laminar flow can tear away in the rear area of the shaped body 1 and turbulences 3 can occur.

Figure 1B:
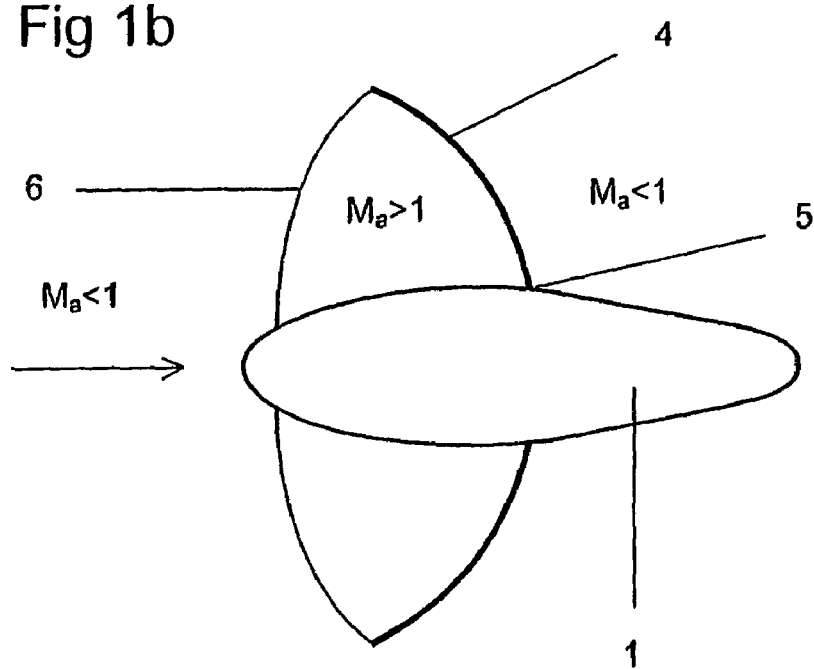
FIG. 1b illustrates the position of the supersonic range relative to a shaped body that is in an air flow in the transonic range.

FIG. 1b illustrates the speeds in the so-called transonic speed range. Relative to the surface of the shaped body 1, a zone forms in which the relative speed of the flowing air in part attains sound velocity. The region is labeled "$M_a>1$" in FIG. 1b. The region is limited in the rear by an impact pressure front 4 with a brief increase in pressure and subsequent drop in pressure. The point 5 marks the location of particular mechanical stress to the surface of the shaped body 1.

Figure 2:
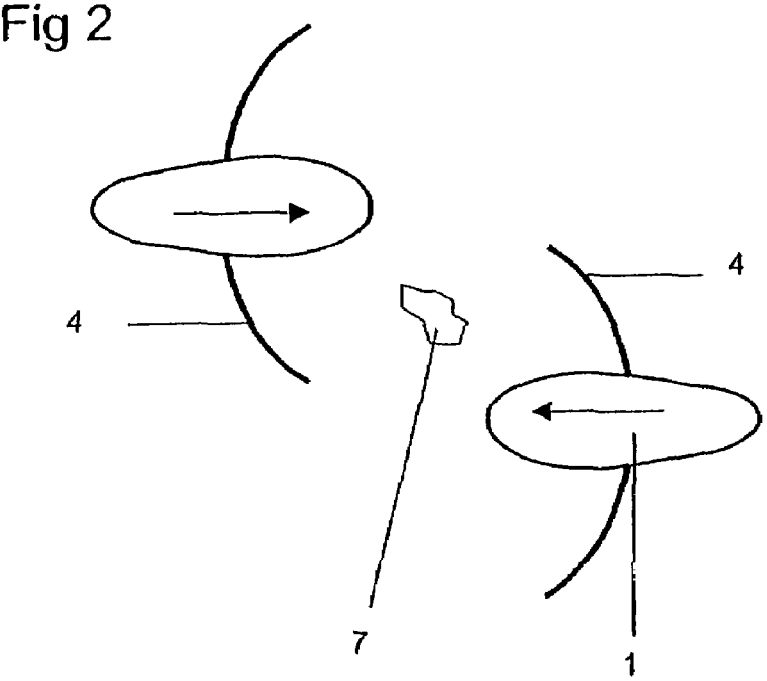
FIG. 2 illustrates the alternating effect of impact pressure fronts on a particle.

FIG. 2 illustrates the effect of the impact pressure fronts 4 on a particle 7. The particle 7 passes through an impact pressure front 4 twice, alternating in a different direction.

Figure 3:
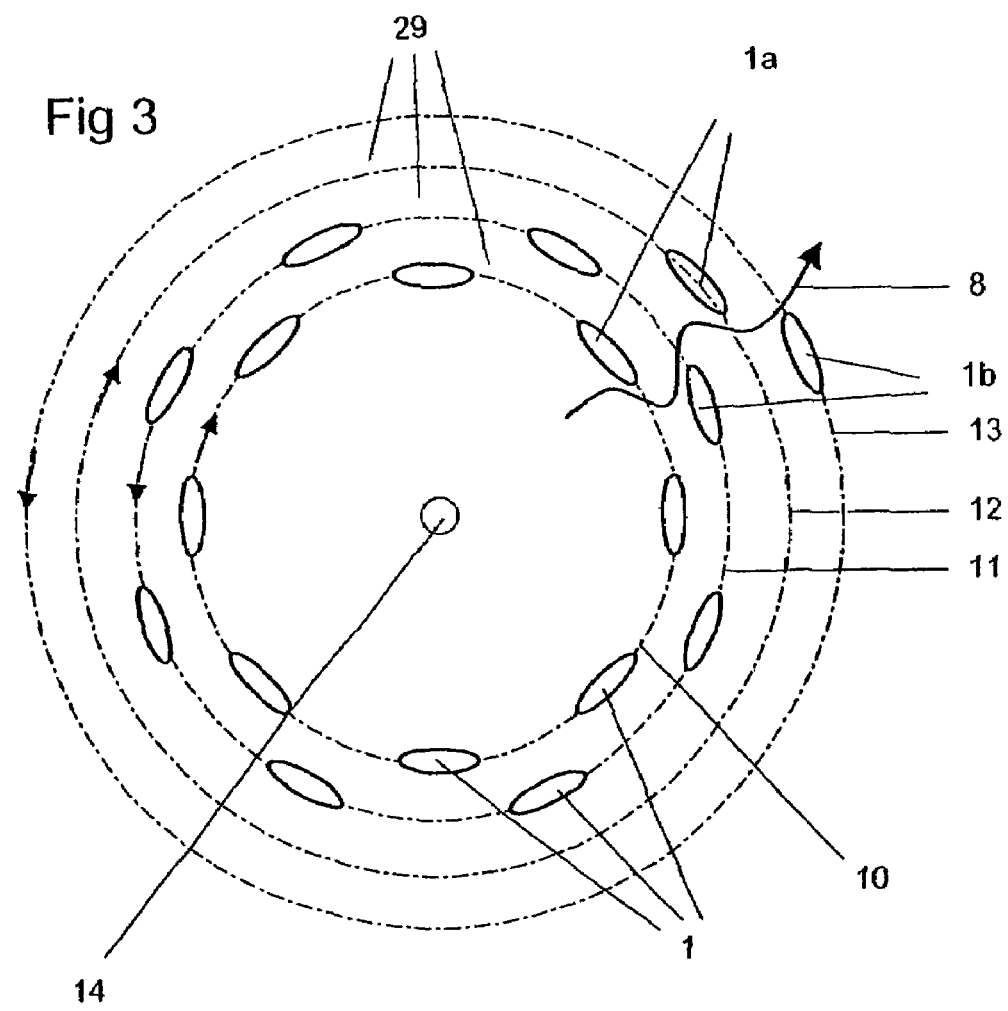
FIG. 3 illustrates the arrangement of shaped bodies moving in opposition to one another.

FIG. 3 illustrates the arrangement of the shaped bodies 1 relative to one another. For instance, two groups of shaped bodies 1a and 1b are illustrated that rotate clockwise or counterclockwise about the axle 14. In the exemplary embodiment, each group contains 16 shaped bodies that rotate about the axle 14 at a rotational frequency of 500 rotations/second. Given a radius of 100 mm, this results in a relative speed of approx. 315 meters/second, i.e. approx. 95% of sound velocity. The sequence of the impact pressure fronts 4, without taking into consideration the opposing group, is 8 kHz. The particle path 8 in the disintegration space 29 is illustrated schematically in FIG. 3.

Figure 4:
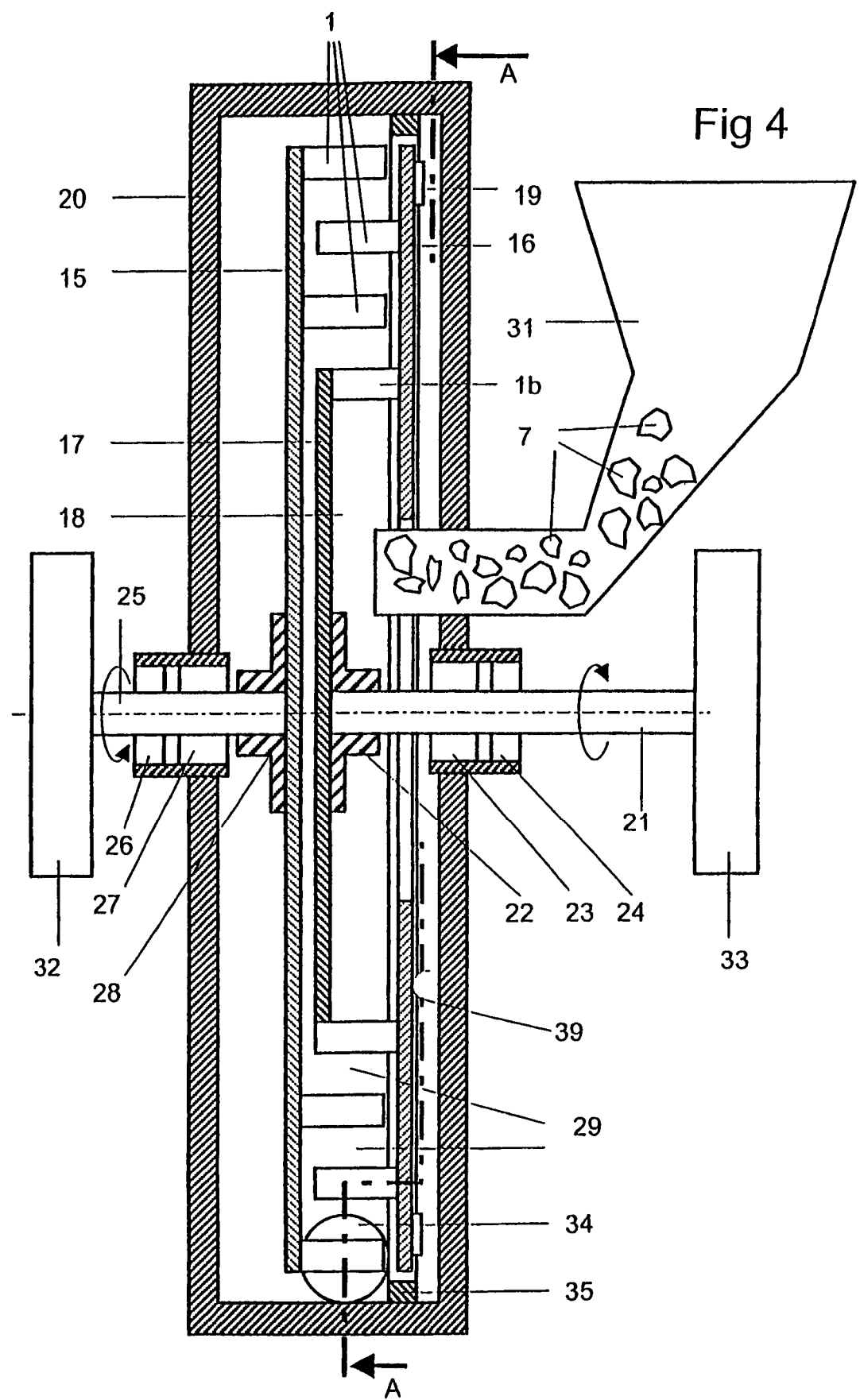
FIG. 4 is a section through the disintegration apparatus.

FIG. 4 illustrates a section of an inventive disintegrator. The shaped bodies 1 of the first group 1a are affixed to the disk 15. Two groups per direction of rotation are used in the exemplary embodiment. The disk 15 is itself affixed to the hub 28 on the axle 25, which is caused to rotate at the necessary minimum speed by a drive motor 32. The axle 25 is borne in the housing 20 via the bearing 26. A shaft seal 27 prevents particles 30 and impurities from exiting the bearing 26. The second group of shaped bodies 1b is affixed to the disk 16. This disk 16 is securely joined to the disk 17 and the axle 21, whereby the axle 21 itself is borne in the housing 20 via the bearing 24. The second group of shaped bodies 1b is driven by the motor 33 against the direction of rotation of the motor 32.

The granulate 7 is added via the filling hopper 31 near the center of the disintegrator to the filling chamber 18. Here the granulate 7 travels into the area of the impact pressure fronts 4 and is pulverized on the way to the exterior areas.

In the design of the inventive disintegrator it should be noted that the disks 15 and 16 rotating at great speed and the shaped bodies 1 affixed thereto pull air along with them, and this air is driven outward by centrifugal forces. While in the disintegration space 29 a continuous change occurs in the rotational speed and thus the speed of the particles 30 is decelerated again and again, the centrifugal force for the two exterior surfaces 38 and 39 of the two disks 15 and 16 remains unchanged. In particular for the disk 16, through which passes the filling hopper 31, the centrifugally accelerated air can lead to undesired suction of the granulate 7 out of the filling hopper 31 at the external surface 39 of the disk 16 and granulate 7 can be conveyed directly to the outlet 34, circumventing the effects of the shaped bodies 1. This effect can be corrected when the exterior surface 39 of the disk 16 is relatively well sealed against the housing 20 by a sealing ring 35. Another solution for this problem is to arrange scoops 19 on the exterior surface 39 of the disk 16; these then counteract the centrifugal force using an opposing air flow.

Figure 5:
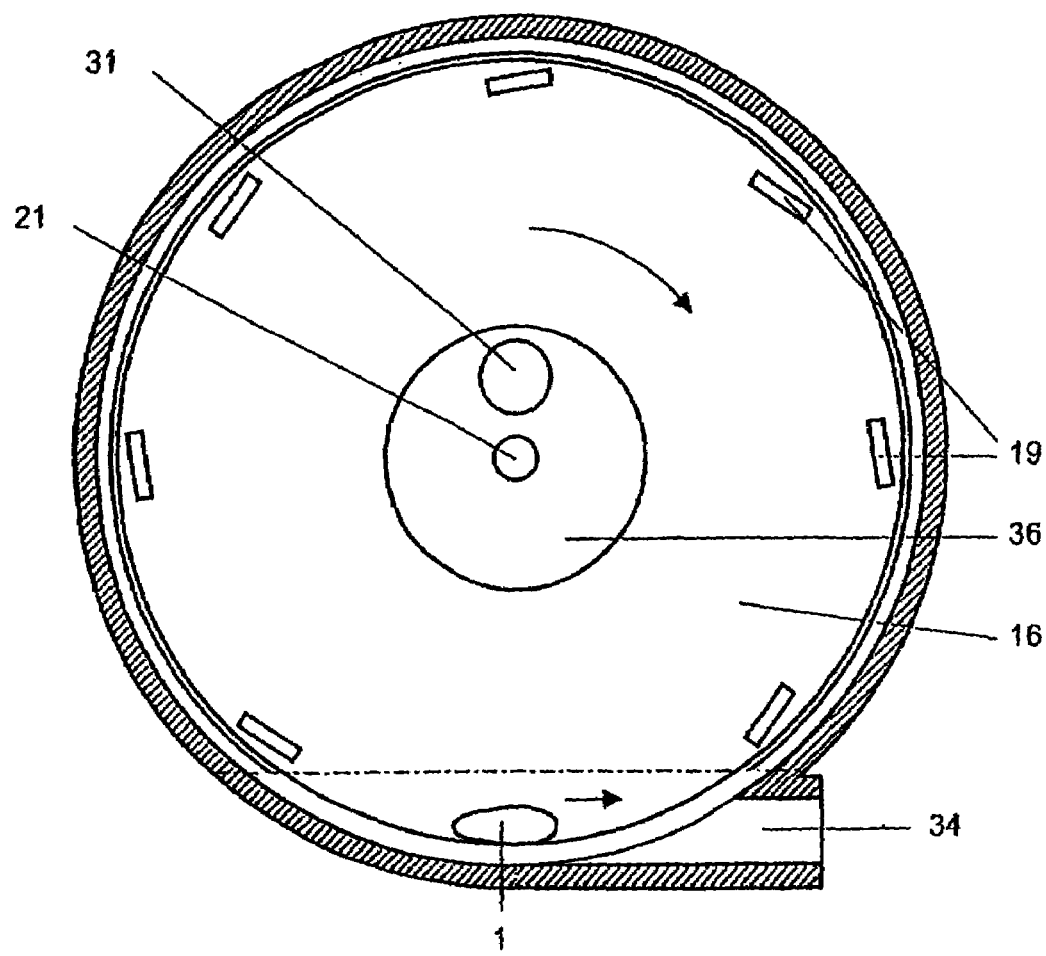
FIG. 5 illustrates a side view of the disintegrator along the line A-A in accordance with FIG. 4.

After passing through the disintegrator space 29, the particles are removed at the outlet 34, as can be seen in FIG. 5.

It has been demonstrated that having the granulate 7 pass through the disintegrator just one time is adequate in terms of the desired comminution and activation. The described apparatus works continuously. As much granulate 7 as can be added to the filling chamber 18 based on the geometry of the filling hopper 31 becomes fully prepared powder made of particles 30 at the outlet 34.

Figure 6:
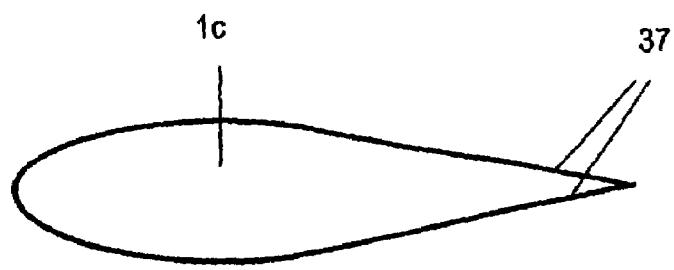
FIG. 6 is a section of shaped body.

FIG. 6 illustrates one particularly advantageous embodiment of the shaped bodies 1. The pointed shape of the outflow surfaces 37 prevents vertices and thus reduces the drive energy required.

Legend
1 Shaped body
2 Tip of shaped body
3 Turbulences
4 Impact pressure front
5 Initial point of impact pressure front
6 Limit of transonic area
7 Granulate
8 Particle path
9 Flow lines
10 Interior radius of shaped body path of disk 16
11 Interior radius of shaped body path of disk 15
12 Exterior radius of shaped body path of disk 16
13 Exterior radius of shaped body path of disk 15
14 Axis of rotation
15 Disk A
16 Disk B 17 Disk B1
18 Filling chamber
19 Scoops
20 Housing
21 Shaft B
22 Hub B
23 Shaft sealing ring B
24 Bearing B
25 Shaft A
26 Bearing A
27 Shaft sealing ring A
28 Hub A
29 Disintegration space
30 Particle
31 Filling hopper
32 Motor for driving disk 15
33 Motor for driving disk 16
34 Outlet
35 Sealing ring
36 Inlet opening
37 Outflow surfaces
38 Exterior surface of disk 15
39 Exterior surface of disk 16

The invention claimed is:

1. Method for comminution and tribochemical activation of inorganic materials, comprising:
moving objects transonically to thereby create impact pressure fronts that occur as compression shocks, said impact pressure fronts having a pulse duration of less than 10 µs and a repetition rate greater than 8 kHz; and
comminuting said inorganic materials to a particle size of less than 1 µm by exposing said inorganic materials to said pressure fronts, wherein
said moving of said objects transonically comprises moving said objects along a curvilinear path wherein a movement of said objects along said curvilinear path is at a transonic speed.

2. Method in accordance with claim 1, wherein said inorganic materials have a crystalline structure, and said comminuting produces a conglomerate of activated mixed crystals that has an increased capacity for crystal formation when water is added.

3. Method in accordance with claim 1, wherein an effective duration of said impact pressure fronts last until a crystal lattice structure of said inorganic materials has been destroyed.

4. Method in accordance with claim 3, wherein said objects are formed in an aerodynamic shape.

5. Method in accordance with claim 3, wherein said objects comprise first objects and second objects, said first objects and second objects moving rotating in opposite directions.

6. Method in accordance with claim 1, wherein the comminution takes place under a protective gas.

7. Method according to claim 1, wherein said objects are formed in an aerodynamic shape.

8. Method according to claim 1, wherein said objects are formed with one end having a rounded shape.

9. Method according to claim 1, wherein said objects are formed with one end having a rounded shape and another end having outer surfaces which converge towards one another as said outer surfaces approach a tip end of said another end.

10. Method according to claim 1, wherein said moving of said objects comprises moving said objects relative to an axis of rotation.

11. Method according to claim 10, wherein said objects comprise first objects and second objects, wherein said first objects and said second objects are moved in different directions.

* * * * *